United States Patent Office 2,802,279
Patented Aug. 13, 1957

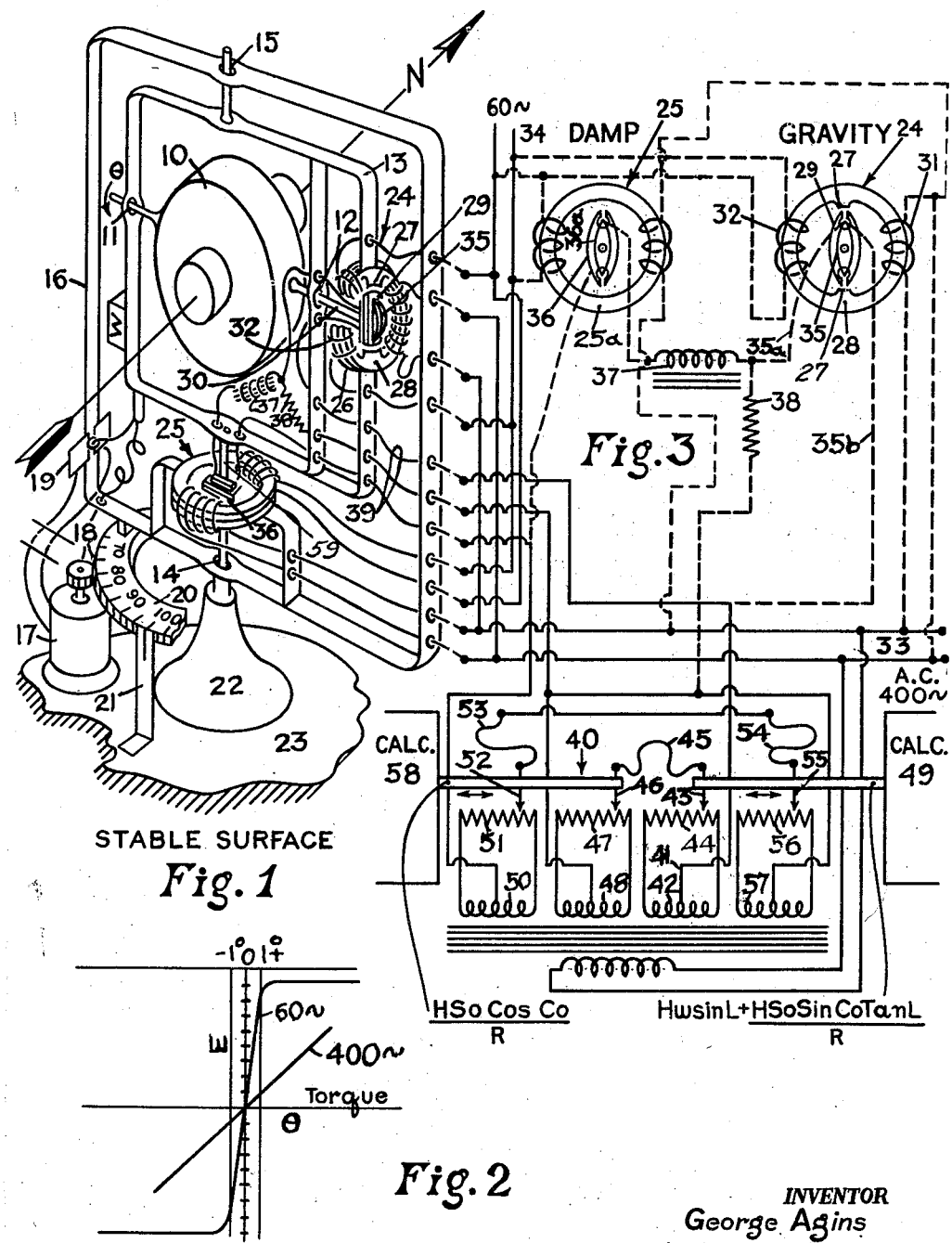

2,802,279

GYROCOMPASS

George Agins, Brooklyn, N. Y., assignor to American Bosch Arma Corporation

Application April 19, 1946, Serial No. 663,370

20 Claims. (Cl. 33—226)

This invention relates to direction-indicating apparatus, and has particular reference to the control of gyrocompasses.

Most successful gyrocompasses indicate the meridian because the sensitive element is pendulous, as is well understood, but, because they are pendulous, they are sensitive to lateral accelerations and become unreliable during such periods. When such pendulous gyrocompasses are mounted on warships, this acceleration instability becomes more pronounced because of the strong acceleration caused by rapid evasive maneuvers that are practiced in modern naval warfare. Consequently, a balanced sensitive element is more practical in such equipments but even a balanced element, such as a balanced gyroscope, is subject to forces other than the north-seeking force and corrections must be provided for all such forces or disturbances, including that due to imperfect balancing, when present, to prevent error in the compass.

In accordance with the present invention, a non-pendulous or balanced gyroscopic compass element is provided, including means for making all necessary corrections, which has all the advantages of the pendulous type but which is substantially unaffected by acceleration, even when stabilization fails.

In a preferred embodiment of the invention, a sensitive gyroscope is supported about horizontal and vertical axes in a normally stabilized frame mounted on an unstable support, such as a ship, airplane, tank, or other vehicle, and is provided with non-pendulous means imparting direction-seeking properties thereto and consisting of a substantially vertical electromagnetic link between the gyroscope and the earth and comprising a motor opposing the tilt of said gyroscope about a horizontal axis and providing a substantially constant increase in tilt reaction torque from zero to approximately one degree of tilt angle and substantially constant tilt-reaction torque above one degree of tilt to compensate for stabilization error of said normally stabilized frame, a damping motor on said vertical axis of the gyroscope support energized from said tilt-opposing motor, whereby the gyroscope tends to indicate the vertical plane of the earth axis about which the supporting vehicle is actually rotating in space, and means for applying calculated corrections to said gyroscope about both of its mounting axes, whereby the gyroscope is caused to indicate the vertical plane of the rotation axis of the earth.

For a more complete understanding of the invention, reference may be had to the accompanying drawings, in which:

Figure 1 is a perspective view of a preferred form of the invention, partially in diagrammatic form;

Fig. 2 is a graph explaining the action of certain of the correcting mechanisms; and, Fig. 3 is a schematic diagram of certain parts shown in perspective in Fig. 1, and, in the interest of clarity, dotted lines are used in Fig. 3 to denote wires having counterparts in Fig. 1, the solid line wires being indicated as connected to their corresponding extensions in Fig. 1.

Referring to Fig. 1 of the drawings, numeral 10 designates a gyroscopic unit including a casing containing a spinning wheel, not shown, but rotating about a horizontal axis. This sensitive unit 10 is in turn mounted on a normally horizontal axis in sensitive bearings 11, 12 in the sensitive frame 13, which is mounted about a vertical axis in similar bearings 14 and 15 in frame 16. Frame 16 serves as a phantom or follow-up member adapted to accurately follow the sensitive frame 13, in a well-known manner, such as by the drive through gearing 18 by follow-up motor 17 controlled by suitable contact mechanism indicated at 19, or by electronic means of well-known type, which responds to an angular displacement between frames 13 and 16 to cause the motor 17 to restore the latter to alignment with the former.

A compass dial, indicated at 20, may be carried on the phantom member 16 to cooperate with the pointer 21 to give the compass reading, and transmitters driven by the follow-up or servo-motor 17 may be provided for transmission of compass course to remote points, all of which is, of course, well understood in the art. In this case, the phantom frame 16 is pivoted in bearings in the base 22 mounted upon the stabilized support indicated by the surface 23 in Fig. 1 and accurately stabilized by means well known and sometimes called "stable element" or "stable zenith," so that under normal conditions axis 14—15 will remain accurately vertical and axis 11—12 accurately horizontal with only a very small margin of error.

The construction just described is known, and when the sensitive element 10 is rendered pendulous, it remains substantially so aligned that the spin axis lies in the meridian plane and in a horizontal plane when indicating North. By means of the present invention the spin axis of element 10 is kept so aligned under all conditions with a very small margin of error, and without rendering the element pendulous and thus sensitive to lateral accelerations. For example, in the present invention, the tilt of the spin axis of gyroscope 10 which occurs from time to time as the result of deviation from the meridian, due to earth rotation, causes a torque to appear immediately around axis 11—12 which tends to bring the spin axis back to horizontal.

Inasmuch as this results in precession of the gyroscope to restore its spin axis to the meridian and the horizontal as a weight does in the pendulous type of compass, the effect is similar to that produced by a pendulous gyroscope, but without the undesired sensitivity to acceleration. The torque-creating system for producing such immediate correction of deviation through the creation of tilt, produces, in effect, a linkage between the horizontal and vertical axes, 11—12 and 14—15, respectively, and a non-gravity link to earth. Such system includes the torque unit 24 which is provided on the horizontal axis 11—12, and the damping torque unit 25 provided upon the vertical axis 14—15, these units being inter-connected by means of a novel electric circuit. In torque unit 24, the stator is secured to sensitive frame 13, while the rotor is secured to supporting shaft 30 of gyroscope 10. In torque unit 25, the stator is secured to follow-up frame 16, while the rotor is secured to supporting shaft 59 of sensitive frame 13.

These units 24 and 25 and the electrical circuits are shown in Figs. 1 and 3. The torque unit 24 comprises laminations similar to those used in a two-pole alternating current motor in that relatively narrow salient pole pieces 27 are arranged on stator 28 to cooperate with the laminated armature 29 and the relative formation of pole pieces 27 and armature 29 are adapted to produce torque between them according to a relation to be explained. Exciting coils 31 and 32 are provided to produce magnetic flux across the armature 29, the left-hand coil 32 being fed with 60 cycle current from source 34 and the right-hand coil 31 being fed with 400 cycle current from the source 33, which also feeds the motor for driving the wheel of gyroscope 10 by wires not shown. The armature 29 has a winding 35 connected to damping torque unit 25 and to correction unit 40, as shown in the drawings.

The torque unit 25 is similar to the unit 24 except that its stator has no salient poles so that, unlike armature 29 of unit 24, it has no particular zero position, although its stator 25a also has 60 cycle and 400 cycle exciting windings for cooperation with winding 36a on armature 36. The armature coil 36a is connected to the choke coil 37 which is provided to control the magnitude of the damping voltage applied to torque unit 25, and the resistance 38 as well as to the calculating unit 40 to be described, and to the torque unit 24. It will be understood that, if desired, this unit 25 may be of the induction motor type having the armature 36 a copper or aluminum shell and the winding 36a transferred to the stator 25a in order to prevent the slightest drag or kick-back from phantom frame 16 to sensitive frame 13, but in the interest of clarity, the simpler magnetic unit is shown.

In considering the operation of the gyrocompass system of this invention, it is appropriate to describe the forces which tend to cause wandering of a sensitive gyroscope such as that shown at 10, and which may be said to be of two kinds, firstly, those forces caused by friction in sensitive mounting bearings, air currents and stray magnetic fields, etc., which may be termed unpredictable forces, and secondly, those forces due to rotation of the earth and travel of the vehicle upon which the compass is mounted, which may be called predictable forces, since they may be accurately calculated. The unpredictable disturbing forces are corrected according to this invention by means of the torque units 24 and 25, inter-connected as shown in Figs. 1 and 3.

Accordingly, when restraint from friction or other unpredictable force causes gyroscope 10 to begin to wander, its spin axis leaves the meridian plane and tilts from the horizontal, according to the law of the gyroscope when restrained about the horizontal axis. Such tilt rotates the armature 29 of torque unit 24 from its normally vertical position and therefore out of exact alignment with the pole pieces 27, so that torque is developed between the armature 29 and the pole pieces 27 and this torque causes the spin axis of gyroscope 10 to precess back toward the meridian. This torque is produced mostly by the 60 cycle current in winding 32, rotation of armature 29 in the field produced by coil 32 lengthening the lines of force of the field. It will be understood that any torque similarly produced by the 400 cycle current in winding 31 is negligible, since the strength of this field is set at only a small fraction of that of the 60 cycle field.

Inasmuch as such precession of the spin axis of gyroscope 10 by torque unit 24 towards the meridian would cause the gyroscope spin axis to overshoot the meridian and take up the well-known elliptical oscillation of an undamped vertically-constrained compass, gyroscope coil 35 on armature 29 comes into action to prevent such over precession. The action of coil 35 is due to the fact that it has been turned out of its neutral position crosswise of the field between pole pieces 27 and therefore has induced therein a current which flows through resistance 38 and causes a parallel current also to flow in armature winding 36a of the armature 36 in the damping unit 25.

Inasmuch as this current in winding 36a of unit 25 coacts mainly with the 60 cycle current in the coil at the left, it develops a torque upon vertical axis 14—15 of sensitive frame 13 to damp the oscillation of the gyroscope spin axis and thus cause it to settle accurately upon the meridian, even when very slightly urged to leave it. Here again the 60 cycle current has far greater effect than the 400 cycle current, because the strength of the 60 cycle current is made nine or ten times that of the 400 cycle currrent, since it has been found that settling is much more rapid with 60 cycle current than with 400 cycle current. On the other hand, the 400 cycle current is more reliable, since the speed of spin of the gyroscope depends on it, and is therefore more suitable to control the second group or predictable disturbances which are calculated.

Referring now to Fig. 3 showing the torque motor 24 and 25 arrangement of Fig. 1 in diagrammatic form, the second of the dual functions of torque motor 24 will be explained. Thus, if the spin axis of gyroscope 10 also tilts when or due to wandering from the meridian, the armature 29 of unit 24 tilts out of the vertical, and the magnetic field is exerted to pull it back to the vertical. This pull, by the chosen proportions of the unit 24, is made to simulate the pull of gravity in a pendulous system without, however, offsetting the center of gravity of the gyroscope with its undesired sensitivity to acceleration effects. Furthermore, the resistance torque of armature 29 being swung out of the vertical is made to increase linearly with increase in tilt angle $\theta$, as shown in Fig. 2 by the flat-topped curve marked 60~, up to one degree of tilt and not to increase beyond one degree of tilt for quite a range of tilt angle, an important function which will be more completely described. This action of unit 24 provides accurate control of azimuth deviation by tilt, but prevents overdamping about the vertical axis when starting up the compass or when stabilization fails, or is not very accurately provided.

The circuits connecting the torque units 24 and 25, best shown in Fig. 3, will be seen to form a pair of loops, there shown in the form of a figure eight when seen from either side of the drawing. The right hand loop may be traced from the upper end of resistance 38, thence along wire 35a to coil 35 on armature 29 of torque unit 24, thence out and down wire 35b to center tap 41 of transformer secondary winding 42, out from brush 43 engaging slidewire resistance 44 supplied thereby, thence to the left through flexible lead 45 to a similar brush 46 on the slidewire resistance 47 to the transformer secondary 48 supplying it, and, from its middle tap upwards to the bottom of resistance 38, thus completing this loop of the whole circuit.

Adjustment of the brush 43 along potentiometer slidewire 44 by operation of the error calculator 49, introduces into the armature winding 35 of torque unit 24 and this right-hand loop the correction voltage expressed as $$HW \sin L + \frac{HS_0 \sin C_0 \tan L}{R} \qquad (1)$$

in which $H$=angular momentum of the gyroscope wheel
$W$=angular velocity of earth rotation
$L$=latitude of the mounting vehicle
$S_0$=speed (linear) of the mounting vehicle
$C_0$=course of the mounting vehicle
$R$=radius of the earth The first term of this Expression 1 will be recognized as the correction for rotation of the earth as modified by the latitude, and the second term as corresponding to $E-W$ "Steaming" error of the compass. The changing voltage represented by Expression 1 causes current to flow in the right-hand loop circuit just described to produce a 400 cycle field around coil 35 in torque unit 24 which, coacting with the 400 cycle field of stator coil 31, applies a torque to the gyroscope 10 about its horizontal axis, 11—12, just sufficient to prevent deviation of the north indication of the compass from the predictable causes mentioned. The curve in Fig. 2 marked 400~ shows the torque to be linear, but this curve may be changed in form, if desired, by design change. The error calculator 49 may be of the type illustrated by Fig. 4 of Patent No. 2,302,894.

Similarly, the left-hand loop of Fig. 3 may be traced from the upper end of common resistance 38 through the choke-coil 37, the winding 36a on the armature 36 of torque unit 25, thence down to the center tap of the transformer winding 50, thence up through slide-wire winding 51, out of slider brush 52, through flexible leads 53 and 54 to brush 55, into slide-wire winding 56, transformer secondary winding 57, out by its center tap and up to the bottom end of resistance 38, completing this loop of the composite circuit. Into this loop there is fed by means of brush 52 a voltage proportional to the quantity $$\frac{HS_0 \cos C_0}{R} \qquad (2)$$

which causes current to flow in armature coil 36a of unit 25, which applies a torque around the vertical axis 14 of the gyroscope 10 which is just sufficient to balance the deviation tendency of the compass from the predictable source usually called "North-steaming error." The brush 52 is slidably actuated by mechanism in the error calculator 58, which may be of the same type as error calculator 49.

It will be understood that the purpose of the additional slide-wire units 46—47 and 55—56 included in the corresponding loop circuits, is to neutralize in each loop the correction applied to the other loop, by means of the voltage drop across resistance 38 which couples the loops electrically. For instance, as illustrated in Figs. 1 and 3, for the left-hand loop containing the vertical or damping torque motor 25, the slider brush 52 applies the necessary correction, and the slider brush 46 applies the neutralizing current for the other right-hand loop. Likewise, for the right-hand loop containing the horizontal or tilt torque motor 24, the slider brush 43 supplies the correction and the slider-brush 55 applies the neutralizing voltage for the other or left-hand loop.

The operation of the form of this invention just described may be summarized as follows: The compass assembly shown in Fig. 1 is carried on a mount 23 which is accurately stabilized at all times in normal circumstances, so that the horizontal torque unit 24 produces an action like that produced by the weight of pendulous compasses, in that it gives no torque around the horizontal when the spin axis of the gyroscope wheel is aligned with the meridian. However, when the spin axis leaves the meridian, it is also tilted from the horizontal and this latter tilt brings into action the horizontal torque unit 24, causing it to apply a torque around the horizontal axis to the gyroscope 10 in the proper sense to cause the gyroscope spin axis to precess back towards the meridian. In order to prevent the spin axis from passing beyond the meridian when restored to it, damping is provided by generating in the same horizontal torque unit 24 an electrical current which is fed to a second torque unit, 25, operating about the vertical axis, which tends to cause the gyroscope spin axis to be suitably damped for a practical and continuous North indication.

It is evident that the operation of the apparatus of this invention depends on accurate stabilizing of the axes of the sensitive system carrying the gyroscope 10. If the system is mounted on a battleship, for example, periods will occur in evasive action in battle when stabilization of the sensitive system by stabilized mount 23 will not be good. Thus, in some cases, even with the best stabilizers, a departure of the axis 14—15 of as much as 5° from vertical may prevail for an appreciable time. In that case the tilt torque motor 24 would interpret the resultant misalignment between its stator 28 and its rotor 29 as a tilt due to deviation of gyroscope 10 from North, whereas it actually is a deviation from vertical. The torque motor would nevertheless respond to cause the spin axis of gyroscope 10 to precess away from North.

If torque motor 24 were of conventional construction, such that an angular deviation of armature 29 from alignment with stator poles 27 would give a resisting torque proportional to the angle of deviation, very serious compass errors would arise, especially on intercardinal courses. It is for this reason that the motor 24 is especially constructed with narrow salient poles 27, so that, as shown by curve 60~ in Fig. 2, an upper limit is placed on the resisting torque, which is so chosen that, when the deviation from vertical of armature 29 exceeds one degree of angle, there is no increase in torque for any deviation beyond one degree. Since tilt of a gyroscope wheel due to normal deviation from the meridian seldom exceeds one degree, very good compass readings are given by the compass of this invention even when there is considerable deviation of the same from vertical.

However, the optimum result of any compass which relies on a spinning wheel with a vertical link to earth, is to indicate the plane containing its spin axis, and that special earth-axis about which the gyro compass is actually rotating, so that corrections are required to obtain accurate North indication. For instance, in the case of a gyrocompass mounted on an aircraft travelling north at high speed, the axis indicated by a compass without correction might be as much as twenty degrees off north. In high speed ships, such an error will be reduced in proportion to the speed and course, but will still require compensation in any case, for accurate North indication. In the present invention, compensating torques are applied about both vertical and horizontal axes to oppose all tendencies to deviation of the spin axis, so that accurate North indication is obtained, without the sensitivity to lateral accelerations to which pendulous gyrocompasses are subject.

Although a preferred embodiment of the invention has been illustrated and described herein, it is to be understood that the invention is not limited thereby, but is susceptible of changes in form and detail within the scope of the appended claims.

I claim:

1. In a gyrocompass adapted to be mounted on a vehicle, the combination of a gyroscope, a normally stabilized frame, means supporting said gyroscope about horizontal and vertical axes in said frame, electrical motive means responsive to a tilt of said gyroscope about said horizontal axis for exerting a restoring torque on said gyroscope about said horizontal axis, second electrical motive means for exerting a torque about said vertical gyroscope-supporting axis, and electrical connections between said first and second motive means, whereby the second motive means is energized in accordance with the current developed in said first motive means for exerting a damping torque about the vertical mounting axis of said gyroscope.

2. In a gyrocompass adapted to be mounted on a vehicle, the combination of a gyroscope, a normally stabilized frame, means supporting said gyroscope about horizontal and vertical axes in said frame, electrical motive means having relatively movable stator and rotor windings responsive to a tilt of said gyroscope about said horizontal axis for exerting a restoring torque on said gyroscope about said horizontal axis, second electrical motive means having relatively movable stator and rotor windings for exerting a torque about said vertical gyroscope-supporting axis, and electrical connections between windings of said first and second motive means, whereby the second motive means is energized in accordance with the current developed in windings of said first motive means for exerting a damping torque about the vertical mounting axis of said gyroscope.

3. In a gyrocompass adapted to be mounted on a vehicle, the combination of a gyroscope, a normally stabilized frame, means supporting said gyroscope about horizontal and vertical axes in said frame, electrical motive means having relatively movable stator and rotor windings responsive to a tilt of said gyroscope about said horizontal axis for exerting a restoring torque on said gyroscope about said horizontal axis, second electrical motive means having relatively movable stator and rotor windings for exerting a torque about said vertical gyroscope-supporting axis, and electrical connections between rotor windings of said first and second motive means, whereby the second motive means is energized in accordance with the current developed in rotor windings of said first motive means for exerting a damping torque about the vertical mounting axis of said gyroscope.

4. In a gyrocompass adapted to be mounted on a vehicle, the combination of a gyroscope, a normally stabilized frame, means supporting said gyroscope about horizontal and vertical axes in said frame, electrical motive means responsive to a tilt of said gyroscope about said horizontal axis for exerting a restoring torque on said gyroscope about said horizontal axis, second electrical motive means for exerting a torque about said vertical gyroscope-supporting axis, electrical connections between said first and second motive means, whereby the second motive means is energized in accordance with the current developed in said first motive means for exerting a damping torque about the vertical mounting axis of said gyroscope, and means interposed on said connections for modifying the control of said second motive means by said first motive means in accordance with predetermined corrections.

5. In a gyrocompass adapted to be mounted on a vehicle, the combination of a gyroscope, a normally stabilized frame, means supporting said gyroscope about horizontal and vertical axes in said frame, electrical motive means having relatively movable stator and rotor windings responsive to a tilt of said gyroscope about said horizontal axis for exerting a restoring torque on said gyroscope about said horizontal axis, second electrical motive means having relatively movable stator and rotor windings for exerting a torque about said vertical gyroscope-supporting axis, electrical connections between windings of said first and second motive means, whereby the second motive means is energized in accordance with the current developed in windings of said first motive means for exerting a damping torque about the vertical mounting axis of said gyroscope, and means interposed in said connections for modifying the control of said second motive means by said first motive means in accordance with predetermined corrections.

6. In a gyrocompass adapted to be mounted on a vehicle, the combination of a gyroscope, a normally stabilized frame, means supporting said gyroscope about horizontal and vertical axes in said frame, electrical motive means having relatively movable stator and rotor windings responsive to a tilt of said gyroscope about said horizontal axis for exerting a restoring torque on said gyroscope about said horizontal axis, second electrical motive means having relatively movable stator and rotor windings for exerting a torque about said vertical gyroscope-supporting axis, electrical connections between rotor windings of said first and second motive means, whereby the second motive means is energized in accordance with the current developed in rotor windings of said first motive means for exerting a damping torque about the vertical mounting axis of said gyroscope, and means interposed in said connections for modifying the control of said second motive means by said first motive means in accordance with predetermined corrections.

7. In a gyrocompass adapted to be mounted on a vehicle, the combination of a gyroscope, a normally stabilized frame, means supporting said gyroscope about horizontal and vertical axes in said frame, electrical motive means responsive to a tilt of said gyroscope about said horizontal axis for exerting a restoring torque on said gyroscope about said horizontal axis, second electrical motive means for exerting a torque about said vertical gyroscope-supporting axis, electrical connections between said first and second motive means, whereby the second motive means is energized in accordance with the current developed in said first motive means for exerting a damping torque about the vertical mounting axis of said gyroscope, potentiometer means interposed in said connections, and means for adjusting the brush of said potentiometer in accordance with a predetermined correction to modify the aforementioned damping action of said second motive means.

8. In a gyrocompass adapted to be mounted on a vehicle, the combination of a gyroscope, a normally stabilized frame, means supporting said gyroscope about horizontal and vertical axes in said frame, electrical motive means having relatively movable stator and rotor windings responsive to a tilt of said gyroscope about said horizontal axis for exerting a restoring torque on said gyroscope about said horizontal axis, second electrical motive means having relatively movable stator and rotor windings for exerting a torque about said vertical gyroscope-supporting axis, electrical connections between windings of said first and second motive means, whereby the second motive means is energized in accordance with the current developed in windings of said first motive means for exerting a damping torque about the vertical mounting axis of said gyroscope, potentiometer means interposed in said connections, and means for adjusting the brush of said potentiometer in accordance with a predetermined correction to modify the aforementioned damping action of said second motive means.

9. In a gyrocompass adapted to be mounted on a vehicle, the combination of a gyroscope, a normally stabilized frame, means supporting said gyroscope about horizontal and vertical axes in said frame, electrical motive means having relatively movable stator and rotor windings responsive to a tilt of said gyroscope about said horizontal axis for exerting a restoring torque on said gyroscope about said horizontal axis, second electrical motive means having relatively movable stator and rotor windings for exerting a torque about said vertical gyroscope-supporting axis, electrical connections between rotor windings of said first and second motive means, whereby the second motive means is energized in accordance with the current developed in rotor windings of said first motive means for exerting a damping torque about the vertical mounting axis of said gyroscope, potentiometer means interposed in said connections, and means for adjusting the brush of said potentiometer in accordance with a predetermined correction to modify the aforementioned damping action of said second motive means.

10. In a gyrocompass adapted to be mounted on a vehicle, the combination of a gyroscope, a normally stabilized frame, means supporting said gyroscope about horizontal and vertical axes in said frame, electrical motive means responsive to a tilt of said gyroscope about said horizontal axis for exerting a restoring torque on said gyroscope about said horizontal axis, second electrical motive means for exerting a torque about said vertical gyroscope-supporting axis, and electrical connections between said first and second motive means including a double loop circuit having one of said motive means in each loop, means for exciting said first motive means, said first motive means energizing said second motive means through said connections to exert a damping torque about the vertical mounting axis of said gyroscope, and means in at least one of said loops for modifying the torque exerted by the corresponding motive means in accordance with predetermined corrections.

11. In a gyrocompass adapted to be mounted on a vehicle, the combination of a gyroscope, a normally stabilized frame, means supporting said gyroscope about horizontal and vertical axes in said frame, electrical motive means responsive to a tilt of said gyroscope about said horizontal axis for exerting a restoring torque on said gyroscope about said horizontal axis, second electrical motive means for exerting a torque about said vertical gyroscope-supporting axis, and electrical connections between said first and second motive means including a double loop circuit having one of said motive means in each loop, means for exciting said first motive means, said first motive means energizing said second motive means through said connections to exert a damping torque about the vertical mounting axis of said gyroscope, and means in each of said loops for modifying the torque exerted by the corresponding motive means in accordance with predetermined corrections.

12. In a gyrocompass adapted to be mounted on a vehicle, the combination of a gyroscope, a normally stabilized frame, means supporting said gyroscope about horizontal and vertical axes in said frame, electrical motive means having relatively movable stator and rotor windings responsive to a tilt of said gyroscope about said horizontal axis for exerting a restoring torque on said gyroscope about said horizontal axis, second electrical motive means having relatively movable stator and rotor windings for exerting a torque about said vertical gyroscope-supporting axis, and electrical connections between said first and second motive means including a double loop circuit having a rotor winding of one of said motive means in each loop, means for exciting a stator winding of said first motive means, said first motive means energizing said second motive means through said connections to exert a damping torque about the vertical mounting axis of said gyroscope, and means in at least one of said loops for modifying the torque exerted by the corresponding motive means in accordance with predetermined corrections.

13. In a gyrocompass adapted to be mounted on a vehicle, the combination of a gyroscope, a normally stabilized frame, means supporting said gyroscope about horizontal and vertical axes in said frame, electrical motive means having relatively movable stator and rotor windings responsive to a tilt of said gyroscope about said horizontal axis for exerting a restoring torque on said gyroscope about said horizontal axis, second electrical motive means having relatively movable stator and rotor windings for exerting a torque about said vertical gyroscope-supporting axis, and electrical connections between said first and second motive means including a double loop circuit having a rotor winding of one of said motive means in each loop, means for exciting a stator winding of said first motive means, said first motive means energizing said second motive means through said connections to exert a damping torque about the vertical mounting axis of said gyroscope, and means in each of said loops for modifying the torque exerted by the corresponding motive means in accordance with predetermined corrections.

14. In a gyrocompass adapted to be mounted on a vehicle, the combination of a gyroscope, a normally stabilized frame, means supporting said gyroscope about horizontal and vertical axes in said frame, electrical motive means responsive to a tilt of said gyroscope about said horizontal axis for exerting a restoring torque on said gyroscope about said horizontal axis, second electrical motive means for exerting a torque about said vertical gyroscope-supporting axis, and electrical connections between said first and second motive means including a double loop circuit having one of said motive means in each loop, means for exciting said first motive means, said first motive means energizing said second motive means through said connections to exert a damping torque about the vertical mounting axis of said gyroscope, potentiometer means in each of said loops, and means for severally adjusting the brushes of said potentiometers for modifying the torque exerted by the corresponding motive means in accordance with predetermined corrections.

15. In a gyrocompass adapted to be mounted on a vehicle, the combination of a gyroscope, a normally stabilized frame, means supporting said gyroscope about horizontal and vertical axes in said frame, electrical motive means responsive to a tilt of said gyroscope about said horizontal axis for exerting a restoring torque on said gyroscope about said horizontal axis, second electrical motive means for exerting a torque about said vertical gyroscope-supporting axis, and electrical connections between said first and second motive means including a double loop circuit having one of said motive means in each loop, means for exciting said first motive means, said first motive means energizing said second motive means through said connections to exert a damping torque about the vertical mounting axis of said gyroscope, potentiometer means in each of said loops, means for severally adjusting the brushes of said potentiometers for modifying the torque exerted by the corresponding motive means in accordance with predetermined corrections, and auxiliary potentiometer means in each loop having their brushes connected to the corresponding adjusting means for neutralizing in the corresponding loop the correction applied to the other loop by said first-named potentiometer means.

16. In a gyrocompass adapted to be mounted on a vehicle, the combination of a non-pendulous gyroscope, a normally stabilized frame, means for supporting said gyroscope about horizontal and vertical axes in said frame, electrical motive means including a stator and a rotor and corresponding energized windings mounted between said gyroscope and said frame and responsive to a tilt of said gyroscope relatively to said frame about said horizontal axis for developing a magnetic field creating an increasing torque about said horizontal axis in opposition to said tilt of said gyroscope, and narrow salient poles on said stator cooperating with said rotor for limiting the development of said magnetic field and consequent torque increase to a predetermined tilt angle, whereby said gyroscope is afforded the direction-seeking properties of a pendulous gyroscope.

17. In a gyrocompass for use on a vehicle, including a non-pendulous gyroscope mounted on horizontal and vertical axes in a normally stabilized frame supported on said vehicle, the combination therewith of non-pendulous means providing a substantially vertical electromagnetic link between said gyroscope and the vertical established by said frame, said means comprising a tilt-opposing motor on said horizontal axis, a damping motor on said vertical axis, electrical connections between said motors whereby said damping motor is energized from said tilt-opposing motor to thereby cause said gyroscope to indicate the vertical plane of the axis about which said vehicle is actually rotating in space, and means in said connections for applying calculated corrections to said gyroscope by means of said motors about both mounting axes, whereby the same is caused to indicate the vertical plane of the said rotation axis.

18. In a gyrocompass for use on a vehicle, including a non-pendulous gyroscope mounted on horizontal and vertical axes in a normally stabilized frame supported on said vehicle, the combination therewith of a non-pendulous means providing a substantially vertical electro-magnetic link between said gyroscope and the vertical established by said frame, said means comprising a tilt-opposing motor on said horizontal axis having substantially constant increase in tilt-reaction torque from zero tilt angle to approximately one degree tilt angle and substantially constant tilt-reaction torque above one degree tilt angle to compensate for error in stabilization of said normally stabilized frame, a damping motor on said vertical axis, electrical connections between said motors whereby said damping motor is energized from said tilt-opposing motor to thereby cause said gyroscope to tend to indicate the vertical plane of the axis about which said vehicle is actually rotating in space, and means in said connections for applying calculated corrections to said gyroscope by means of said motors about both mounting axes, whereby the same is caused to indicate the vertical plane of the said rotation axis.

19. In a gyrocompass for use on a vehicle, including a non-pendulous gyroscope mounted on horizontal and vertical axes in a normally stabilized frame supported on said vehicle, the combination therewith of non-pendulous means providing a substantially vertical electro-magnetic link between said gyroscope and the vertical established by said frame, said means comprising a tilt-opposing motor on said horizontal axis, a damping motor on said vertical axis, electrical connections between said motors whereby said damping motor is energized from said tilt-opposing motor to thereby cause said gyroscope to indicate the vertical plane of the axis about which said vehicle is actually rotating in space, and means in said connections for applying calculated corrections to said gyroscope by means of said motors about both mounting axes, whereby the same is caused to indicate the vertical plane of the said rotation axis, said motors operating on alternating current of low frequency for tilt correction and damping and on alternating current of high frequency for applying said calculated corrections.

20. In a gyrocompass for use on a vehicle, including a non-pendulous gyroscope mounted on horizontal and vertical axes in a normally stabilized frame supported on said vehicle, the combination therewith of a non-pendulous means providing a substantially vertical electro-magnetic link between said gyroscope and the vertical established by said frame, said means comprising a tilt-opposing motor on said horizontal axis having substantially constant increase in tilt-reaction torque from zero tilt angle to approximately one degree tilt angle and substantially constant tilt-reaction torque above one degree tilt angle to compensate for error in stabilization of said normally stabilized frame, a damping motor on said vertical axis, electrical connections between said motors whereby said damping motor is energized from said tilt-opposing motor to thereby cause said gyroscope to tend to indicate the vertical plane of the axis about which said vehicle is actually rotating in space, mechanism in said connections for applying calculated corrections to said gyroscope by means of said motors about both mounting axes, whereby the same is caused to indicate the vertical plane of the said rotation axis, and means included in said mechanism for neutralizing the effect of the calculated corrections for one motor upon the other motor.

References Cited in the file of this patent

UNITED STATES PATENTS

| | | |
|---|---|---|
| 2,044,899 | Carter | June 23, 1936 |
| 2,302,894 | Ross | Nov. 24, 1942 |
| 2,342,655 | Esval | Feb. 29, 1944 |

FOREIGN PATENTS

| | | |
|---|---|---|
| 545,694 | Great Britain | June 9, 1942 |